No. 609,157. Patented Aug. 16, 1898.
H. L. MERRITT.
TIRE.
(Application filed May 15, 1897.)

(No Model.)

WITNESSES:
H. P. Guillo.
John R. Snow.

INVENTOR:
H. L. Merritt.

THE NORRIS PETERS CO., PHOTO-LITHO., WASHINGTON, D. C.

United States Patent Office.

HAMILTON L. MERRITT, OF SOMERVILLE, MASSACHUSETTS.

TIRE.

SPECIFICATION forming part of Letters Patent No. 609,157, dated August 16, 1898.

Application filed May 15, 1897. Serial No. 636,632. (No model.)

*To all whom it may concern:*

Be it known that I, HAMILTON L. MERRITT, of Somerville, in the county of Middlesex and State of Massachusetts, have invented an Improved Tire, of which the following is a specification, reference being had to the accompanying drawings, in which—

Figure 1:
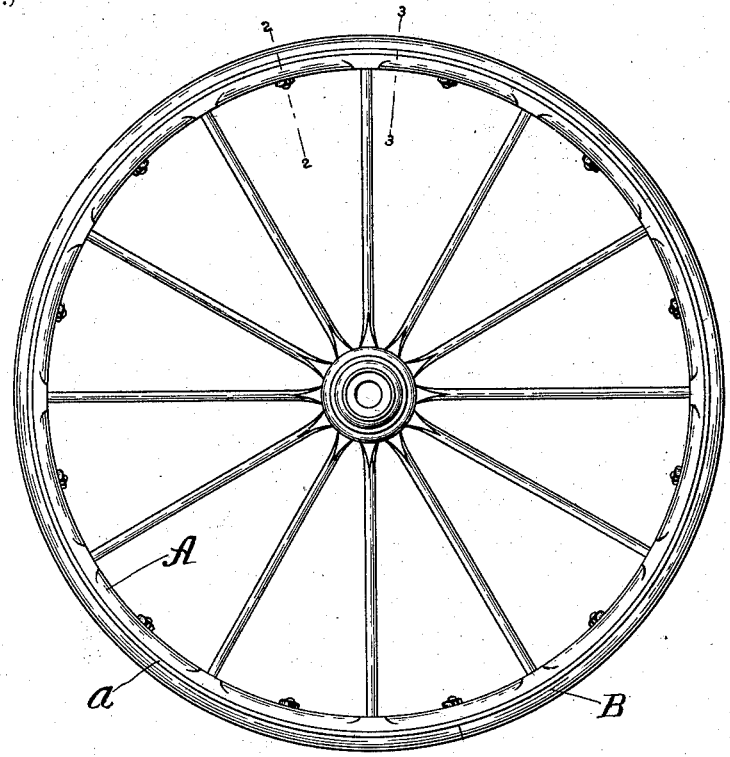
Figure 2:
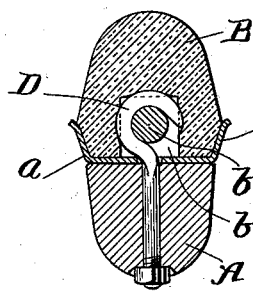
Figure 4:
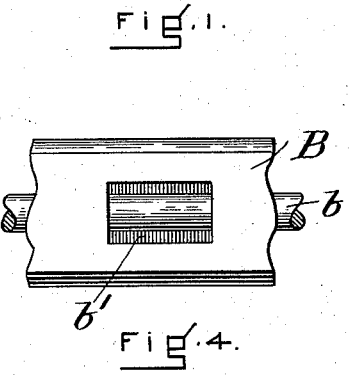
Figure 3:
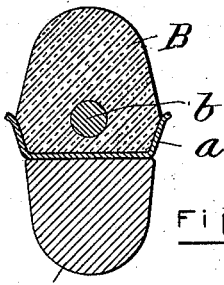
Figure 6:
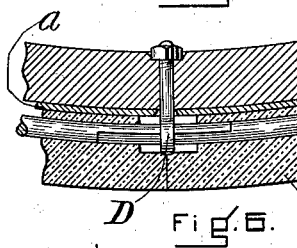
Figure 5:
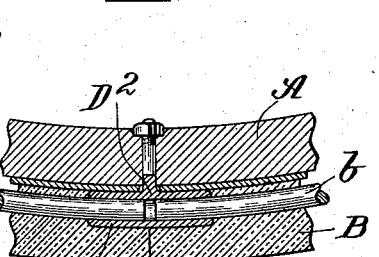
Figure 7:
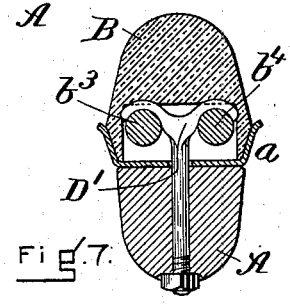

Figure 1 is an elevation of a wheel with my improved tire in place. Fig. 2 is a section on line 2 2 of Fig. 1. Fig. 3 is a section on line 3 3 of Fig. 1. Fig. 4 is an elevation showing a portion of the inner circumference of my tire. Fig. 5 is a partial longitudinal section of Fig. 1, showing the ends of the tire and means for holding them in place. Fig. 6 is a like view showing another form.

My invention relates to rubber tires which are made up of a rubber portion, which is reinforced by a wire running through it. All tires of this class known to me are fastened in place by bolts, which are either strung on the wire before the rubber is molded in place or are screwed into the wire through the rubber portion. The chief objection to tires made in either of the above ways is that the wave which rolls along the tire when it is in use on a wheel cannot pass the shanks of the bolts or screws which hold the tire in place, as the rubber fits closely about the shanks, and the consequence is that the tire is wrenched at all these fastenings and soon needs repairs.

The main feature of my invention resides in providing the rubber portion with a series of slots arranged along the inner circumference of the tire and through which slots the shanks of the bolts pass, the object being to allow the wave to pass by the shanks of the bolts freely, and thus save the wear on the tire.

As shown in the drawings, my improved tire is made up of the rubber portion B, provided with the wire $b$ running through it, and is provided with slots $b'$ cut out of the rubber portion at intervals along its inner circumference, exposing the wire $b$. These slots are preferably made about two inches long and are so disposed along the length of the tire as to come about the middle of the spaces between the spokes of the wheel. The tire is held on the wheel by means of hooked bolts D, the hooked ends of which engage the wire $b$, the shanks of the bolts passing through the slots $b'$ and through the rim of the wheel.

The tire is preferably made straight or slightly curved, and when it is to be secured to the rim of the wheel a bolt is engaged with the wire near the middle of the tire. The rubber is then worked along the wire toward that fastening until it is compressed as much as possible, and the bolts on both sides of the first bolt are then engaged with the wire through the openings $b'$, and this operation is repeated until the tire is secured about the wheel. It will be clear that as the shanks of the bolts are in the slots the wave which rolls along the tire can pass the bolts and the jar and wrench to the tire is thus avoided.

The ends of the tire are fastened together in place on the wheel by the tube $b^2$, into which the ends of the wire are inserted and which fits loosely over the ends of the wire. I have shown the tube $b^2$ as integral with one of the bolts D, but it may obviously be separate, and this method of securing the ends of the tire in place by means of a tube into which the ends of the wire fit loosely is the second feature of my invention.

What I claim as my invention is—

1. The tire above described made up of wire $b$ and rubber portion B provided along its inner circumference with slots $b'$ which expose the wire and furnish open chambers for the shanks of the fastening-bolts, substantially as shown and described.

2. In combination the tire made up of rubber portion B and wire $b$; tube $b^2$ which fits loosely over the ends of the wire $b$ and bolts D one of which is fast to tube $b^2$, all substantially as described.

HAMILTON L. MERRITT.

Witnesses:
WM. MAYNADIER,
JOHN R. SNOW.